United States Patent
Nakashima

(10) Patent No.: US 11,973,911 B2
(45) Date of Patent: Apr. 30, 2024

(54) MANAGEMENT SYSTEM THAT ACQUIRES DATA OF SELECTED JOBS OUTSIDE OF A PRESET TRANSMISSION PERIOD BASED ON PREDEFINED INFORMATION, MANAGEMENT METHOD, IMAGE PROCESSING DEVICE, IMAGING PROCESSING METHOD, AND STORAGE MEDIUM

(71) Applicant: CANON KABUSHIKI KAISHA, Tokyo (JP)

(72) Inventor: Kazuya Nakashima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/165,541

(22) Filed: Feb. 7, 2023

(65) Prior Publication Data
US 2023/0262186 A1 Aug. 17, 2023

(30) Foreign Application Priority Data
Feb. 16, 2022 (JP) ................................ 2022-021818

(51) Int. Cl.
*H04N 1/32* (2006.01)
*G06F 3/12* (2006.01)

(52) U.S. Cl.
CPC ....... *H04N 1/32128* (2013.01); *G06F 3/1205* (2013.01); *G06F 3/1273* (2013.01); *H04N 2201/218* (2013.01)

(58) Field of Classification Search
CPC .. H04N 1/32128; G06F 3/1205; G06F 3/1273
USPC ........................................................ 358/1.15
See application file for complete search history.

(56) References Cited

U.S. PATENT DOCUMENTS

| | | | |
|---|---|---|---|
| 6,424,429 B1* | 7/2002 | Takahashi | H04N 1/00244 358/1.16 |
| 8,867,083 B2 | 10/2014 | Shimada | |
| 2007/0146772 A1* | 6/2007 | Castellani | G06K 15/02 358/1.15 |
| 2013/0155458 A1* | 6/2013 | Kanakubo | G06F 3/1229 358/1.15 |

FOREIGN PATENT DOCUMENTS

JP 2006330939 A 12/2006

* cited by examiner

*Primary Examiner* — Allen H Nguyen
(74) *Attorney, Agent, or Firm* — ROSSI, KIMMS & McDOWELL LLP

(57) ABSTRACT

A management system includes a memory and a processor executing instructions causing the management system to supply information regarding one or more types of jobs; detect predetermined information from the information regarding the job included in the storage system; and transmit a request including identification information of a job corresponding to detection of the predetermined information to the image processing device. In the image processing device, when a request is received, data including image data which corresponds to the job corresponding to the identification information designated by the request is transmitted so that the data is stored in the storage system even outside of the period of time. The instructions further cause the management system to supply the image data corresponding to the job stored in the storage system in response to the request.

10 Claims, 12 Drawing Sheets

FIG. 11

| | User | Execution time | Type of operation | File name | Matched keyword | Job image |
|---|---|---|---|---|---|---|
| | userA | 2021/12/1 09:00 | Printing | A.pdf | Business plan | Mid-term business plan |
| 1101 | userA | 2021/12/1 08:20 | Copying | – | – | xxxx |

Detection result — 700

MANAGEMENT SYSTEM THAT ACQUIRES DATA OF SELECTED JOBS OUTSIDE OF A PRESET TRANSMISSION PERIOD BASED ON PREDEFINED INFORMATION, MANAGEMENT METHOD, IMAGE PROCESSING DEVICE, IMAGING PROCESSING METHOD, AND STORAGE MEDIUM

BACKGROUND OF THE INVENTION

Field of the Invention

The present invention relates to a management system, a management method, an image processing device, an image processing method, and a storage medium with regard to a process of acquiring information regarding a job executed by the image processing device and storing the information in a storage system on a cloud.

Description of the Related Art

There are job history information auditing systems formed by image forming devices (or image processing device) such as multi-function peripherals and storage servers. The image forming devices execute jobs such as printing, scanning, FAX transmitting, and copying, generate job history information regarding the executed jobs, and transmit the job history information to storage servers. The storage servers supply functions of receiving, storing, and retrieving the job history information from the image forming devises (Japanese Patent Laid-Open No. 2006-330939).

The job history information includes job execution users, execution dates and times, device information, document names, and types of executed jobs as, for example, information at the time of execution of a job. Documents used for a job may be included as image data.

Manager users use the retrieving function supplied by storage servers to monitor and confirm whether there are general users executing a job illegally. Here, there is a detection function of reducing monitoring loads of the manager users. The detection function is a function of setting detection target conditions in advance and sending the manager users emails when the detection target conditions are matched at the time of execution of a job. The detection conditions also have keyword settings, text string information included in image data included in documents is extracted, and emails are sent when keywords set in advance are detected. According to this function, detected content can be confirmed instantly without the manager users frequently executing monitoring behaviors.

There is a function of setting a transmission time when job history information generated by an image forming device is transmitted to a storage server. This is a function in which a period of time such as late night can be set for transmission since it puts a high load on an in-house network in transmission of job history information, in particular, image data.

In recent years, as countermeasures for solving introduction problems such as server environment construction and server maintenance, it has become possible to construct a storage server of a job history information auditing system on a cloud. Hereafter, a storage server constructed on a cloud is called a storage service.

However, when the storage service has the detection function, there is concern that a timing at which an output with a problem is ascertained will be late due to a function of setting a transmission period of time. For example, when a function of setting a period of transmission time is set to nighttime, the storage service receives job history information executed in the daytime on the night of that day. The storage service executes a detection process from content of the job history information. Therefore, when there is a detected job, a manager user receives an email notification of the detected job at night. In this case, there is concern that a timing at which the manager user ascertains the output with the problem will be late. To prioritize detection, it is necessary to transmit the job history information instantly. However, this may impose a transmission load on an in-house network in the daytime as described above.

SUMMARY OF THE INVENTION

The present invention has been made in view of the above-described problems and an objective of the present invention is to enable instant detection and confirmation while reducing a transmission load even when a period of transmission time is set to reduce the transmission load.

To achieve the foregoing objective, according to an aspect of the present invention, a management system includes a memory storing instructions and a processor executing the instructions causing the management system to: supply information regarding one or more types of jobs included in a storage system that stores information regarding a job transmitted from an image processing device that executes the job accompanying an output of an image; detect predetermined information from the information regarding the job included in the storage system; and transmit a request including identification information of a job corresponding to detection of the predetermined information to the image processing device. In the image processing device, image data corresponding to an executed job is transmitted in a preset period of time via a network so that the information regarding the job is stored in the storage system, and attribute information and identification information of the executed job are transmitted at a timing which does not depend on the period of time. In the image processing device, when the request is received, data including image data which corresponds to the job corresponding to the identification information designated by the request is transmitted so that the data is stored in the storage system even outside of the period of time. The instructions further cause the management system to supply the image data corresponding to the job stored in the storage system in response to the request.

Further features of the present invention will become apparent from the following description of exemplary embodiments (with reference to the attached drawings).

BRIEF DESCRIPTION OF THE DRAWINGS

FIG. 11 is a diagram illustrating an exemplary detection result screen supplied by the storage service according to the second embodiment.

DESCRIPTION OF THE EMBODIMENTS

Hereinafter, embodiments of the present invention will be described with reference to the drawings. The following embodiments do not limit the present invention related to the claims and combinations of features to be described in the embodiments are not all necessarily essential for solutions of the present invention. In the following embodiments, a management system including an image processing device that executes a job accompanying an output of an image and a storage system that stores information regarding a job transmitted from the image processing device will be described as an example. An image forming device 101 will be exemplified as the image processing device and a storage service 111 will be exemplified as the storage system in description.

First Embodiment

Figure 1:
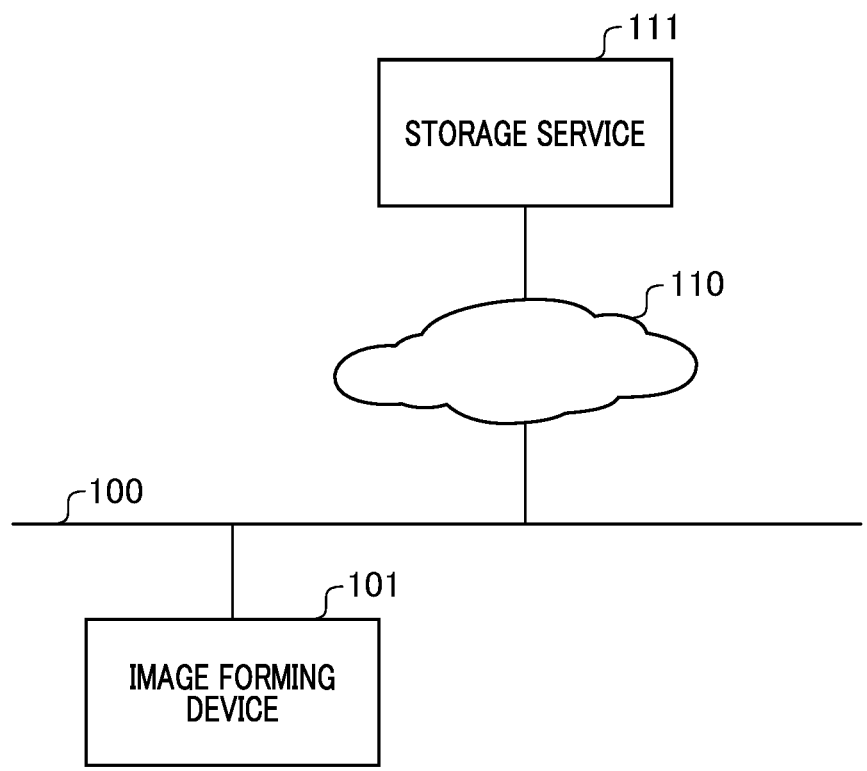
FIG. 1 is a diagram illustrating an overall configuration of a management system according to a first embodiment.

FIG. 1 is a diagram illustrating an overall configuration of a management system according to a first embodiment. A network 100 is a LAN such as an in-house network (intranet). The image forming device 101 is connected to the network 100. The network 110 is the Internet and the storage service 111 is connected to the network 110. In the embodiment, each single device is illustrated, but a plurality of devices may each be connected to the network 100 or the storage service 111.

The image forming device 101 has functions such as scanning, printing, copying, and FAX transmission and executes a job when a user executes an operation. For the executed job, the image forming device 101 has a job history information recording function of generating job history information after the job execution or in parallel to the job execution and storing the job history information in a storage device. The image forming device 101 has a function of transmitting the job history information stored in a storage device to the storage service 111. The image forming device 101 further has a function of performing image processing such as OCR processing on image data of the job history information. The OCR is abbreviation for optical character recognition. To realize these functions, the image forming device 101 may be a multi-function peripheral (MFP).

The storage service 111 receives the job history information from the image forming device 101 and stores the job history information in a storage device such as a database or a predetermined folder. The storage service 111 has a function of transmitting an email indicating that the job history information matches a preset condition to a set email address when the job history information matches the preset condition.

Figure 2:
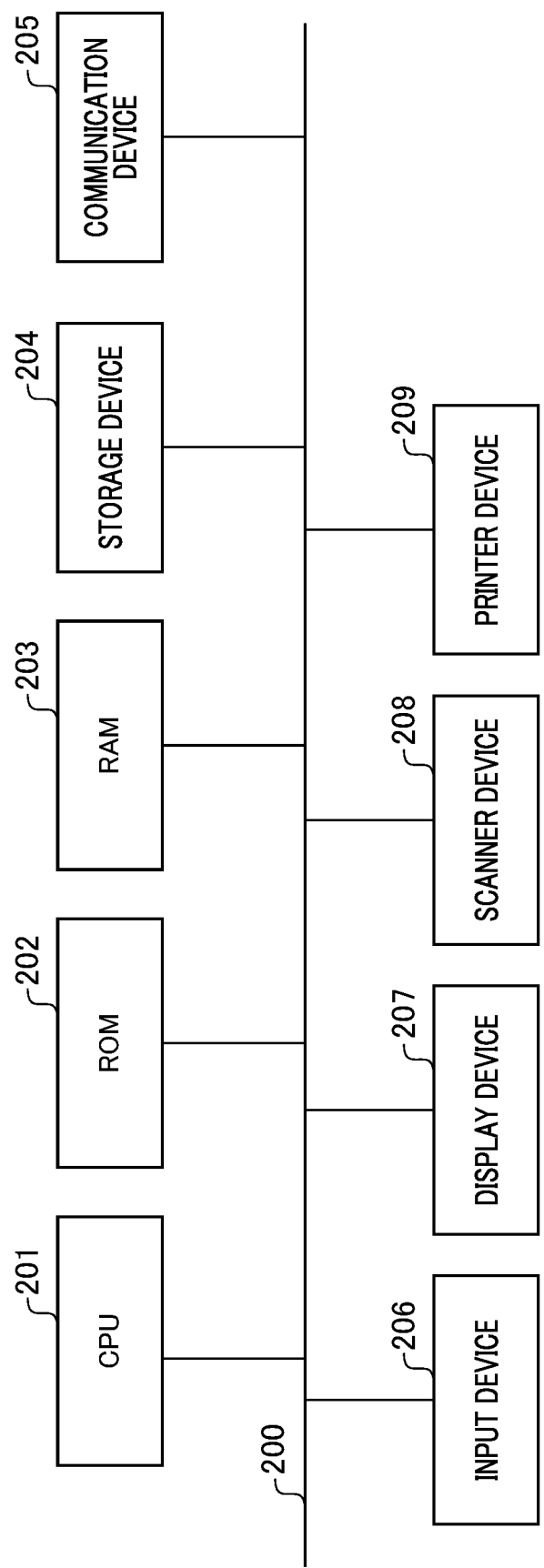
FIG. 2 is a block diagram illustrating an exemplary hardware configuration according to the first embodiment.

FIG. 2 is a block diagram illustrating an exemplary hardware configuration according to the first embodiment. FIG. 2 illustrates an exemplary hardware configuration of the image forming device 101 and the storage service 111 illustrated in FIG. 1. A hardware configuration of a general information processing device can be applied to a PC or the image forming device 101 according to the embodiment.

A CPU 201 generally controls the entire hardware, controls each unit connected to a bus 200, and executes each function such as printing or scanning, for example. A ROM 202 is a memory for only data reading and stores, for example, a basic control program of the image forming device. A RAM 203 is a memory capable of executing data reading and writing and is used as, for example, a working memory of the CPU 201.

A storage device 204 is used as a storage area of temporary data or persistent data during execution of each program. For example, as the storage device 204, an HDD is used in many cases, but a device which is capable of executing reading and writing data and into which an external medium such as an SSD, a CD, a DVD, or a memory card is loaded may be used. A communication device 205 connects the image forming device 101 or the storage service 111 to a LAN or the Internet to enable data communication between devices in conformity with TCP/IP.

An input device 206 is an operational unit that receives a user input operation for text or data. For example, the input device 206 is a keyboard, a mouse, a hard key, or a touch panel. A display device 207 is a device that displays various screens and is, for example, a liquid crystal display or a touch panel. A user executes an instruction on a user interface screen displayed on the display device 207 via the input device 206 to give a job execution instruction to the image forming device 101 or a setting instruction of the storage service 111. A scanner device 208, a printer device 209, and the bus 200 are additionally connected to the image forming device 101.

Figure 3:
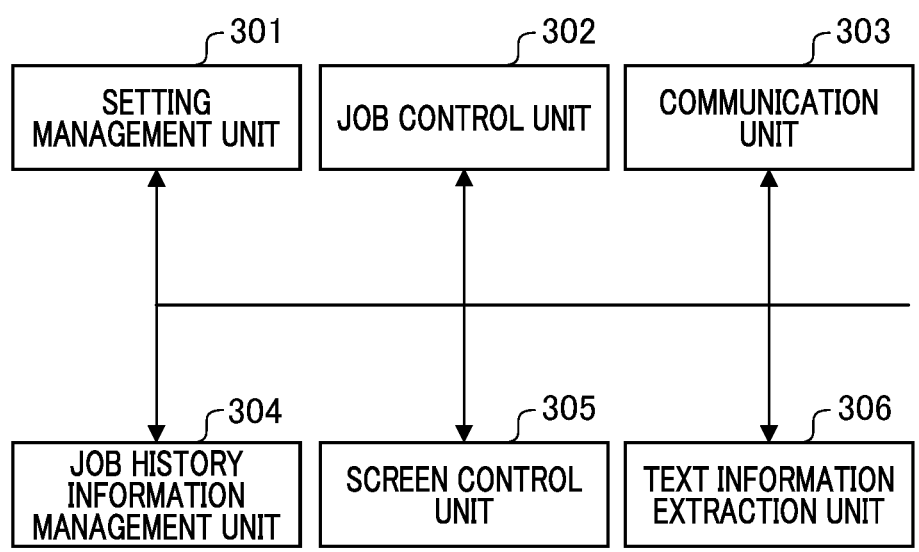
FIG. 3 is a block diagram illustrating an exemplary software configuration of an image forming device according to the first embodiment.

FIG. 3 is a block diagram illustrating an exemplary software configuration of the image forming device 101 according to the first embodiment. The software configuration illustrated in FIG. 3 is realized when the CPU 201 reads, for example, a program stored in the ROM 202 to the RAM 203 and executes the program.

A setting management unit 301 stores a setting related to execution of various functions of the image forming device 101 in each storage device such as the RAM 203 and the storage device 204 and reads the setting from each storage device. Here, the setting includes, for example, a copy setting for executing a copy function, a print setting for executing a print function, a network setting, or individual identification information. The setting includes transmission destination information or storage destination information when job history information is generated at the time of execution of a job. Further, setting information regarding a period of time in which the job history information managed by a setting management unit 401 (to be described below) of the storage service 111 is transmitted is acquired, and is managed by the setting management unit 301. In this way, the setting management unit 301 according to the embodiment functions as a setting unit that manages a setting of a period of time in which image data to be described below is transmitted to the outside via a network.

A job control unit 302 executes various types of jobs by controlling the scanner device 208 and the printer device 209 based on a job execution request input by the input device 206 or received by a communication unit 303. For example, in the case of a reservation printing job, the communication unit 303 temporarily reserves a printing job received from a printing client PC (not illustrated) by the communication unit 303 in the storage device 204. Thereafter, an output of a printing job reserved in response to a user instruction via the input device 206 of the image forming device 101 is executed.

For example, the communication unit 303 receives a printing job and a job execution request from the printing client PC (not illustrated). The job history information is transmitted to the storage service 111 or a request for transmitting image information is received. Further, setting information input on a setting screen of the storage service 111 is received to be reflected in a setting value of the setting management unit 301. The communication unit 303 according to the embodiment functions as a first transmission unit that transmits identification information, attribute information, and feature information of a job and also functions as a second transmission unit that transmits image data. The communication unit 303 transmits various types of information in response to a request from a part of the management system, such as the storage service 111.

When a job is executed in the job control unit 302, a job history information management unit 304 generates job history information after the job execution or in parallel to the job execution and stores the job history information in the storage device 204. The job history information generated by the job history information management unit 304 also includes image data. In this way, the job history information management unit 304 according to the embodiment functions as a management unit that manages image data which is an output target in an executed job. As will be described below, the job history information management unit 304 according to the embodiment also functions as a supply unit that supplies information regarding a job to the storage service 111.

A screen control unit 305 displays a screen on the display device 207 and receives an instruction from the user via the input device 206.

A text information extraction unit 306 executes an OCR process on the image data which is a part of the job history information generated and stored by the job history information management unit 304 to extract text information. The extracted text information is managed as job history information. In this way, the text information extraction unit 306 according to the embodiment functions as an acquisition unit that acquires feature information such as text information from the image data which is an output target in the executed job. The text information according to the embodiment is an example of text information extracted from the image data.

Figure 4:
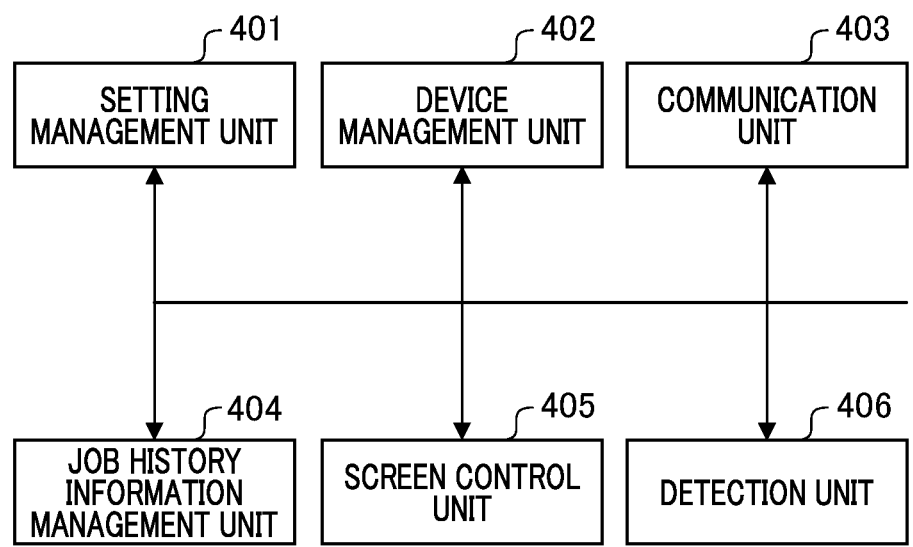
FIG. 4 is a block diagram illustrating an exemplary software configuration of a storage service according to the first embodiment.

FIG. 4 is a block diagram illustrating an exemplary software configuration of the storage service 111 according to the first embodiment. The software configuration illustrated in FIG. 4 is realized when the CPU 201 reads a program stored in the storage device 204 to the RAM 203 and executes the program.

A setting management unit 401 stores various setting values of the image forming device 101 or the storage service 111 in the storage device 204 and reads the setting values as necessary. Here, the setting values of the image forming device 101 include, for example, an email transmission destination setting and a condition setting for email notification to a manager, for example, when the job history information matches a specific condition. An image transmission time setting of the image forming device 101 is also included. The image forming device 101 refers to the image transmission time setting of the setting management unit 401 via the communication unit 303 to reflect the image transmission time setting in the setting management unit 301.

A device management unit 402 manages information regarding the plurality of image forming devices 101. In the embodiment, the image forming device 101 is registered in the storage service 111 when a system is introduced. The communication unit 303 of the image forming device 101 transmits registration information including individual identification information to the communication unit 403 of the storage service 111. The device management unit 402 of the storage service 111 stores the registration information including the individual identification information in the storage device 204. Accordingly, the storage service 111 can receive the job history information coming from the image forming device 101 and managed by the device management unit 402.

A communication unit 403 receives various requests or processing results transmitted from the image forming device 101. The communication unit 403 receives the job history information from the image forming device 101 or transmits a request for image information. The communication unit 403 is also in charge of executing an email transmission process. The communication unit 403 functions as a transmission unit that transmits a request including identification information of a job corresponding to detection of predetermined information to be described below to the image forming device 101.

A job history information management unit 404 stores the job history information received from the image forming device 101 via the communication unit 403 and stores the job history information in the storage device 204 of the storage service 111. When a user instruction is given via the input device 206 on a retrieval screen or the like (not illustrated), the requested job history information is read from the storage device 204 and is displayed on the display device 207. The job history information management unit 404 may have a specification for deleting the job history information for which a predetermined period has passed. This is because a use capacity of the storage device 204 is prevented from increasing or a processing speed for retrieving the job history information is prevented from being reduced due to the increase in the use capacity.

A screen control unit 405 displays a screen on the display device 207 through the screen control unit 405 and receives an instruction from the user via the input device 206.

A detection unit 406 determines whether the job is job history information corresponding to a detection condition set by the setting management unit 401 based on the job history information transmitted from the image forming device 101. When it is determined that the detection condition is matched, the detection unit 406 gives an email notification to an email address set in the setting management unit 401. The detection unit 406 functions as a detection unit that detects predetermined information from information regarding the job included in the storage service 111.

Figure 5:
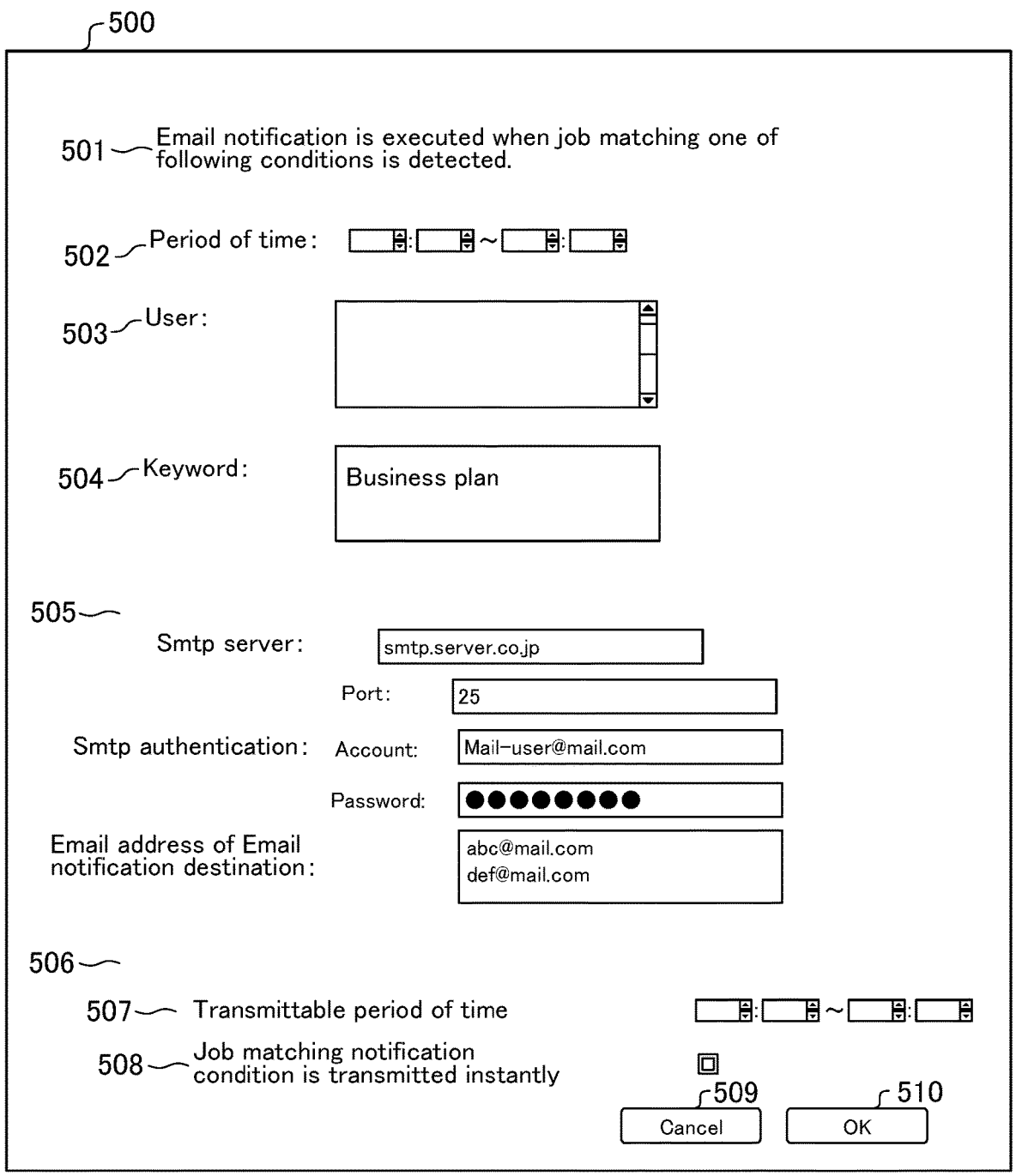
FIG. 5 is a diagram illustrating an exemplary setting screen supplied by the storage service according to the first embodiment.

FIG. 5 is a diagram illustrating an exemplary setting screen supplied by the storage service 111 according to the first embodiment. The screen control unit 405 of the storage service 111 displays the exemplary setting screen of FIG. 5.

On a setting screen 500, setting values input by the user via the input device 206 are stored in the storage device 204 of the storage service 111 by the setting management unit 401. Some of the setting values designated on the setting screen 500 are acquired periodically via the communication unit 403 by the image forming device 101 and are stored in the storage device 204 of the image forming device 101 by the setting management unit 301.

A detection setting 501 is a user interface (UI) for setting a condition of the detected job history information. In the embodiment, a period of time, a user, and a keyword can be set. In the embodiment, when the job history information corresponds to one of these setting items, the job history information is determined to be job history information matching the condition.

The period of time 502 is a UI in which whether to correspond to a period of time in which an execution time of the job is designated is set as a detection condition by inserting time information such as from when to when. In this way, the period of time 502 is set in advance.

A user 503 is a UI in which whether to correspond to the user executing the job is set as a detection condition by designating a user.

A keyword 504 is a UI in which makes it a detection condition whether or not the designated keyword is included in text information extracted from the image data of the job in question by designating the keyword. In the embodiment, a keyword has a function as an example of feature information acquired from image data which is an output target in the job.

In an email setting 505, an email setting for executing an email notification is designated when there is a job matching the detection setting 501. As the email setting, for example, an SMTP server or a port name, an account and a password for SMTP authentication, and an email address of an email notification destination are designated.

An image transmission time setting 506 is a UI for setting a transmission condition when the image forming device 101 transmits the image data of the job history information to the storage service 111.

A transmittable period of time 507 is a UI for designating a period of time in which the image forming device 101 transmits the image data of the job history information to the storage service 111. By including time information such as from when to when, the image forming device 101 transmits job history information of data other than image data to the storage service 111 when the job is executed and in a case other than the designated time, and transmits the image data at a designated time. When the time of execution of the job is within the designated time, the job history information including the image data is transmitted. Even when a setting of the transmittable period of time 507 is not input, the job history information including the image data at the time of execution of the job is transmitted.

A notification condition matching job instant transmission setting 508 is a UI for setting a permission for transmitting image data without designating the transmittable period of time 507 in the job history information matching the condition of the detection setting 501. When the transmittable period of time 507 is not input, a check box is in a disabled state.

a cancellation button 509 is a button for cancelling the setting input on the setting screen 500 without being reflected. An OK button 510 is a button for reflecting the setting input on the setting screen 500.

Figure 6:
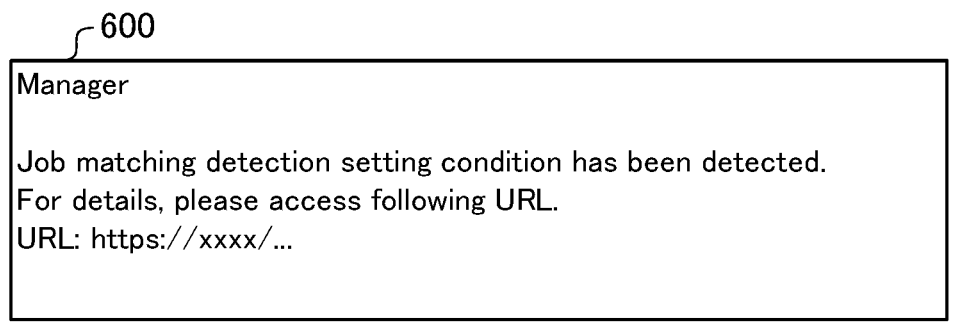
FIG. 6 is a diagram illustrating a text body example of an email transmitted by the storage service according to the first embodiment.

FIG. 6 is a diagram illustrating a text body example of an email transmitted by the storage service 111 according to the first embodiment. A text body example of the email in FIG. 6 is transmitted when a job is detected by the detection unit 406 of the storage service 111.

An email screen 600 is a message document of an email to be transmitted when a job is detected by the detection unit 406. The message document of the mail includes the fact that the job matching a condition of the detection setting 501 is detected and URL information for displaying the details. The URL is an abbreviation for unform resource locator.

Figure 7:
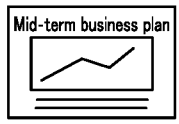
FIG. 7 is a diagram illustrating an exemplary detection result screen supplied by the storage service according to the first embodiment.

FIG. 7 is a diagram illustrating an exemplary detection result screen supplied by the storage service 111 according to the first embodiment. A detection result 700 is a screen on which job history information matching a condition of a detection setting is displayed and is displayed when access to the URL information included in the message document of the email screen 600 is executed. The URL is an abbreviation for a uniform resource locator.

A detection result job history information 701 is a display example of job history information detected in the first embodiment. The job history information is a user name, a job execution time, a type of operation, a file name, a matched keyword, and a job image. The job image is a thumb nail of the job image data. When there is a page corresponding to the matched keyword, the page is displayed. Otherwise, a first page is displayed. When the thumb nail is selected, an operation of downloading an image data file also including another page may be executed. The file name is a file name generated by executing the job.

Figure 8:
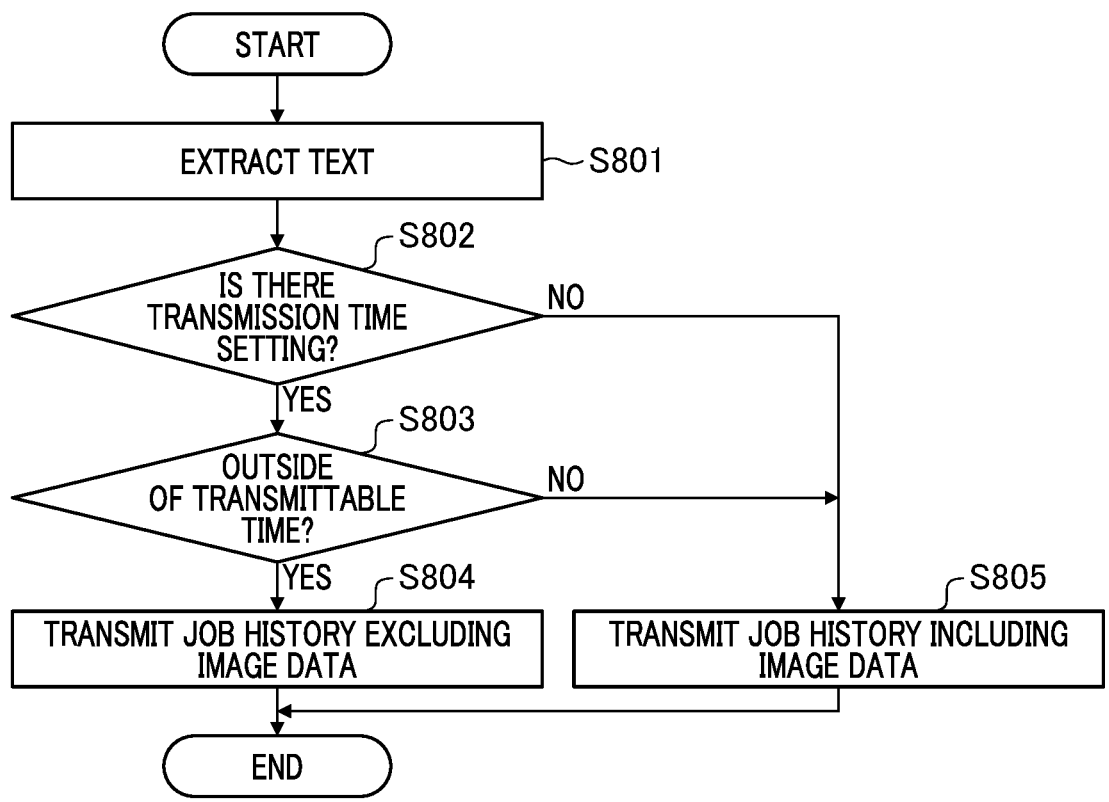
FIG. 8 is a flowchart of a situation in which the image forming device according to the first embodiment receives job execution and transmits job history information to the storage service.

FIG. 8 is a flowchart of a situation in which the image forming device 101 according to the first embodiment receives a job execution and transmits job history information to the storage service 111. The flowchart of FIG. 8 shows a procedure in which the job history information management unit 304 generates job history information after job execution or in parallel to the job execution and the communication unit 303 transmits the job history information to the storage service 111. In the following description, each step is denoted by a reference numeral with S.

S801 is a process in which the text information extraction unit 306 extracts the text information from the image data of the job history information. The extracted text information is managed as one piece of job history information by the job history information management unit 304. Thereafter, the process proceeds to S802.

In S802, the job history information management unit 304 determines that a transmission time setting is made in the setting management unit 301. As illustrated in the example of FIG. 5, it is determined whether a time is set in the transmittable period of time 507. When the transmission time is set, the process proceeds to S803. Otherwise, the process proceeds to S805.

In S803, the setting management unit 301 determines whether a current time is outside of the range of the transmission time setting. When the current time is outside of the range, the process proceeds to S804. Otherwise, the process proceeds to S805.

In S804, the job history information management unit 304 transmits the job history information excluding the image data to the storage service 111 via the communication unit 303. The image data not transmitted at this time is transmitted to the storage service 111 when a time is within the range of the transmission time setting. After this process, the flowchart ends.

The following Table 1 shows an example of the job history information transmitted in S804.

TABLE 1

| JOB ID | USER | EXECUTION TIME | TYPE | FILE NAME | TEXT INFORMATION | IMAGE DATA |
|---|---|---|---|---|---|---|
| 00005 | userA | 2021 Dec. 1 09:00 | PRINT | a.pdf | MID-TERM BUSINESS PLAN | NO |

The job history information includes a job ID uniquely indicating a job, a job execution user, a job execution time, a type of job, a file name, text information, and image data. When there is image data, the image data is transmitted as binary information. Here, in the embodiment, the job history information is an example of a use history related to a job and the job ID is an example of identification information of the job and is an example of a name of the job in the type of job. The name of the job is a type of attribute information. The attribute information includes at least information of a job execution user (owner information of the job) and individual identification information (identification information of the image processing device) in addition to the name of the job.

The following Table 2 shows an example of image data of the job history information transmitted after the job history information.

TABLE 2

| JOB ID | IMAGE DATA |
|---|---|
| 00005 | YES |

As the job history information transmitted later, there are a job ID and image data. With the job ID, the job history information and the image data transmitted earlier are associated with each other and are managed as the same job history information.

In S805, the job history information management unit 304 transmits the job history information including the image data to the storage service 111 via the communication unit 303. A specific example of the job history information is a state in which there is the image data in the job history information of Table 1. After this process, the flowchart ends.

In this way, when there is the preset period of time, the image data corresponding to the executed job is transmitted in the period of time preset in the image transmission time setting 506 in principle. On the other hand, the identification information and the attribute information of the executed job are transmitted at a timing which does not depend on the period of time.

Figure 9:
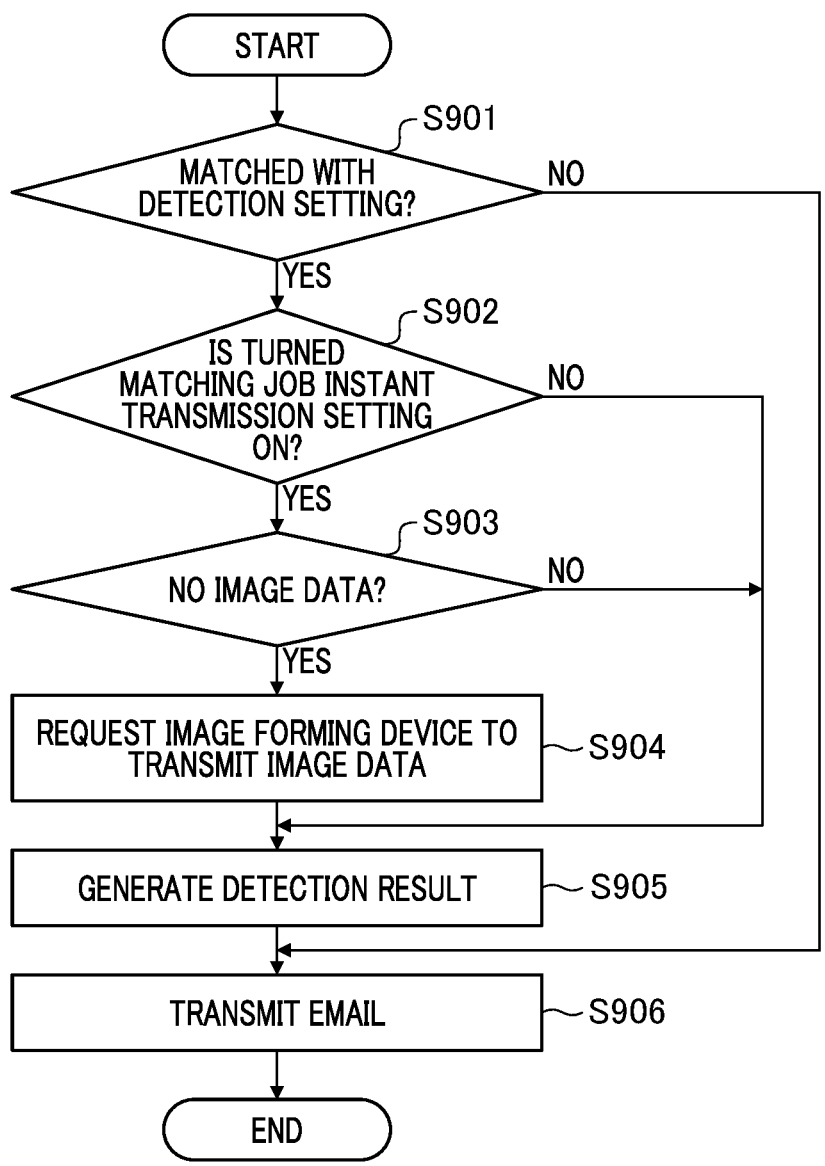
FIG. 9 is a flowchart of a situation in which the storage service according to the first embodiment receives the job history information and executes a detection process.

FIG. 9 is a flowchart of a situation in which the storage service 111 according to the first embodiment receives the job history information and executes a detection process. FIG. 9 illustrates a process of determining detection of the job history information transmitted from the image forming device 101 and the process after the detection in the detection unit 406 of the storage service 111.

In S901, the detection unit 406 determines whether the job history information received from the communication unit 403 matches the detection setting of the setting management unit 401. For example, a determination process will be described in the example of the detection setting 501 in FIG. 5.

detection setting information in the example of the detection setting 501 in FIG. 5 is shown in Table 3.

TABLE 3

| PERIOD OF TIME | USER | KEYWORD |
|---|---|---|
| | | BUSINESS PLAN |

The detection setting information of Table 3 is an undesignated period of time, an undesignated user, and a keyword "business plan." The detection setting information according to the embodiment functions as predetermined information which is a detection target included in information regarding the job.

A specific example of the process will be described in the examples of the job history information of Table 1 and the detection setting information of Table 3. First, it is determined from the execution time of Table 1 and the period of time of Table 3 whether the job history information is a job executed for the period of time of the detection setting. In the example of Table 3, the period of time is not a matching condition because the period of time is non-designation.

Subsequently, it is determined from the users of Tables 1 and 3 whether the job history information is a job executed by the user of the detection setting. In the example in Table 3, the user is non-designation, so it is not a matching condition.

Finally, it is determined from text information of Table 1 and a keyword of Table 3 whether the job history information is a job including a keyword of the detection setting. "Business plan" is designated in the keyword of Table 3, and this keyword is included in "Mid-term business plan" which is a part of the text information of Table 1, and thus is matched as a condition.

Accordingly, in the examples of Tables 1 and 3, the process of S901 is determined to be Yes. For the keyword, not only text information of the job history information but also a file name may be targeted. As described above, when the detection setting is matched in the determination of S901, the process proceeds to S902. When the detection setting is not matched in the determination of S906, the process proceeds to S906.

S902, the detection unit 406 determines whether a matching job instant transmission setting is turned ON. Specifically, it is determined whether the notification condition matching job instant transmission setting 508 included in the setting management unit 401 is turned ON. In the case of ON, the process proceeds to S903. Otherwise, the process proceeds to S905.

In S903, the detection unit 406 determines whether the image data is included in the job history information. Specifically, it is determined whether there is the image data of the job history information of Table 1. When the image data is not included, the process proceeds to S904. When the image data is included, the process proceeds to S905.

In S904, the detection unit 406 request the image forming device 101 to transmit the image data. Specifically, the detection unit 406 obtains the device information from the device management unit 402 and requests the device to transmit the image data of the job via the communication unit 403. The image forming device 101 transmits the image data of the job requested to be transmitted to the storage service 111. As a specific example, the job history information such as Table 2 is transmitted. The job history information management unit 404 of the storage service 111 stores and manages the image data as image data of the job history information with the same job ID stored in advance. A method of making a request for transmitting the image data may be realized as a form in which the image forming device 101 confirms whether there is a periodic request to the storage service 111.

In S905, the detection unit 406 generates a detection result. Specifically, as information used for the screen control unit 405 to display the detection result, a job history information list is generated and a URL for transition to the display screen is generated. The detection result job history information 701 is an example of display (see FIG. 7). The URL may be a URL indicating a generated display screen. The URL may be a URL displaying a retrieval result of the job history information. For example, the URL includes information for retrieving with a job ID of a detection result. When access to the URL is made, a result obtained by retrieving the job history information using the job ID of the detection result is displayed on a screen. After this process, the process proceeds to S906.

In S906, the detection unit 406 transmits an email of a job detection result. Specifically, an email text body including the URL of the detection result generated in S905 is transmitted to a destination of the email setting 505 of the setting management unit 401 via the communication unit. An example of the transmitted email text body is the email screen 600 or the like (see FIG. 6).

In the embodiment, the job history information management unit 404 may have a specification for deleting the job history information for which a predetermined period has passed, as described above. However, the present invention is not limited thereto. The job history information matching with the detection setting in S901 may have a specification which is not a deletion target.

Second Embodiment

Next, a second embodiment of the present invention will be described. The configuration of the first embodiment is a basis of the second embodiment. Therefore, in the following description, configurations that have the same functions as those of the first embodiment are denoted by the same reference numerals, description thereof will be omitted, and only differences from the first embodiment will be described.

In the first embodiment, even when a transmission period of time is set to reduce a transmission load, instant detection and confirmation can be made while reducing the transmission load by earlier transmitting only information for which a detection function is necessary. However, when a manager user may want to confirm the job history information of the same user as the detected job history information, there is a problem that image data cannot be referred to. For example, the manager user wants to conform whether the same user executes an illegal job in addition to the detected job history information in some cases. In the first embodiment, since only image data of a detection target job is requested from the image forming device 101, there is no image data of other job history information of the same user in the storage service 111.

An objective of the second embodiment is to be able to also confirm latest job history information of the same user as job history information matched with a detection condition in addition to the first embodiment. That is, in the second embodiment, a use history related to a job which is a job before or after the above-described request target job and is a job that has the same user information is included in a request target.

Figure 10:
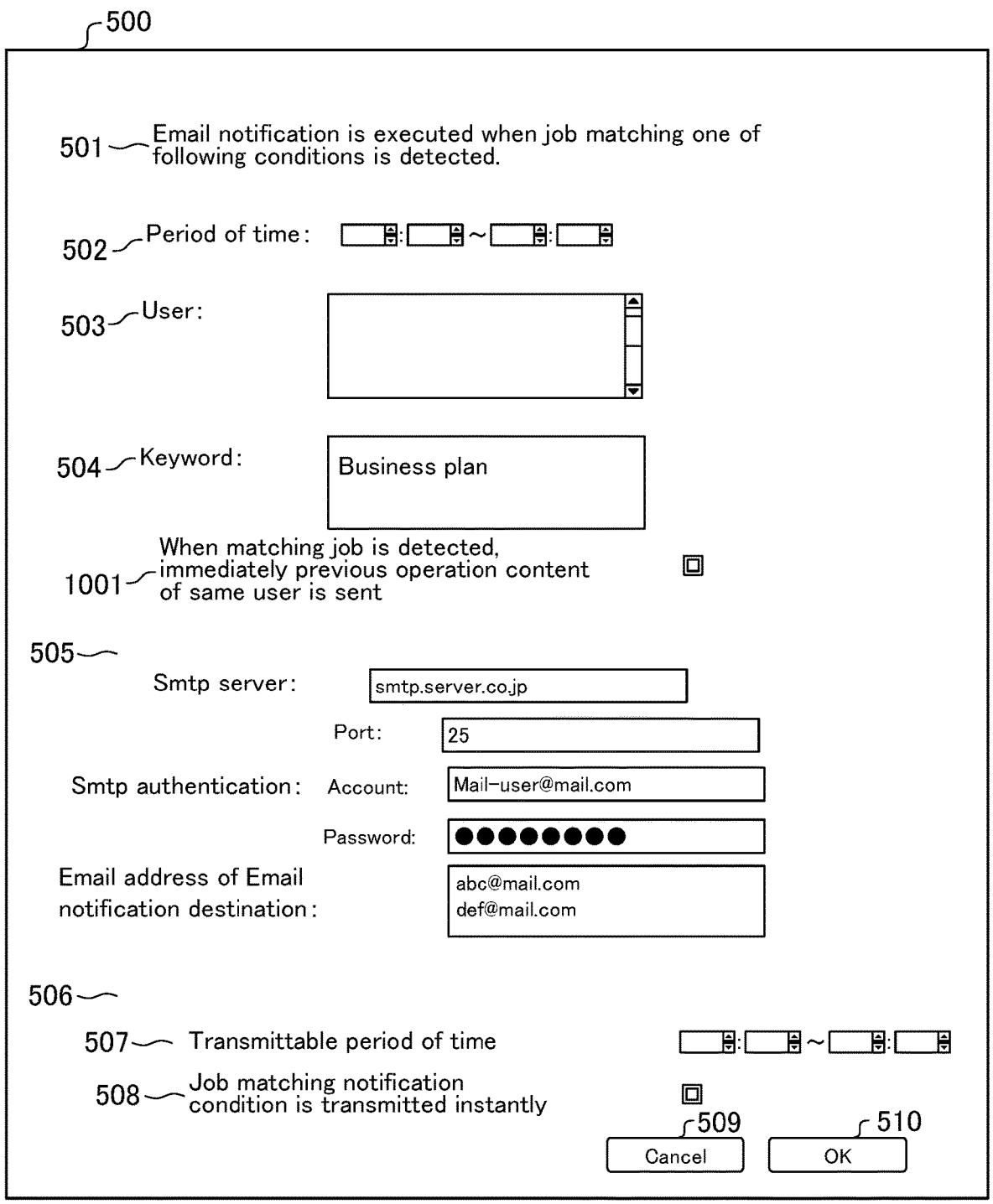
FIG. 10 is a diagram illustrating an exemplary setting screen supplied by the storage service according to a second embodiment.

FIG. 10 is a diagram illustrating an exemplary setting screen supplied by the storage service 111 according to the second embodiment. FIG. 10 illustrates an exemplary setting screen displayed by the screen control unit 405 of the storage service 111. A difference from the first embodiment is that an immediately previous operation content notification setting 1001 is included.

The immediately previous operation content notification setting 1001 is a UI for setting whether a job is set as a notification target when the job history information is matched with the detection setting 501 and the same user executes the job immediately before the job history information. When this setting is turned on and there is a job matched with the detection setting 501, the immediately previously executed job of the same user is also included in a notification result target to execute a process. The immediately previous definition may be a definition such as one hour or one day immediately before. The immediately previous definition may be able to be set.

FIG. 11 is a diagram illustrating an exemplary detection result screen supplied by the storage service 111 according to the second embodiment. A difference from the first embodiment is display content of the detection result job history information.

Detection result job history information 1101 is a display example of job history information detected in the second embodiment. The job history information includes not only job history information matched with the setting of the detection setting 501 but also immediately previous job history information of the same user as the matching job history information. In the example of the detection result job history information 1101 in FIG. 11, the job history information matched with the setting of the detection setting 501 is shown in the upper part and a display result of the immediately previous job history information of the same user is shown in the lower part.

Figure 12:
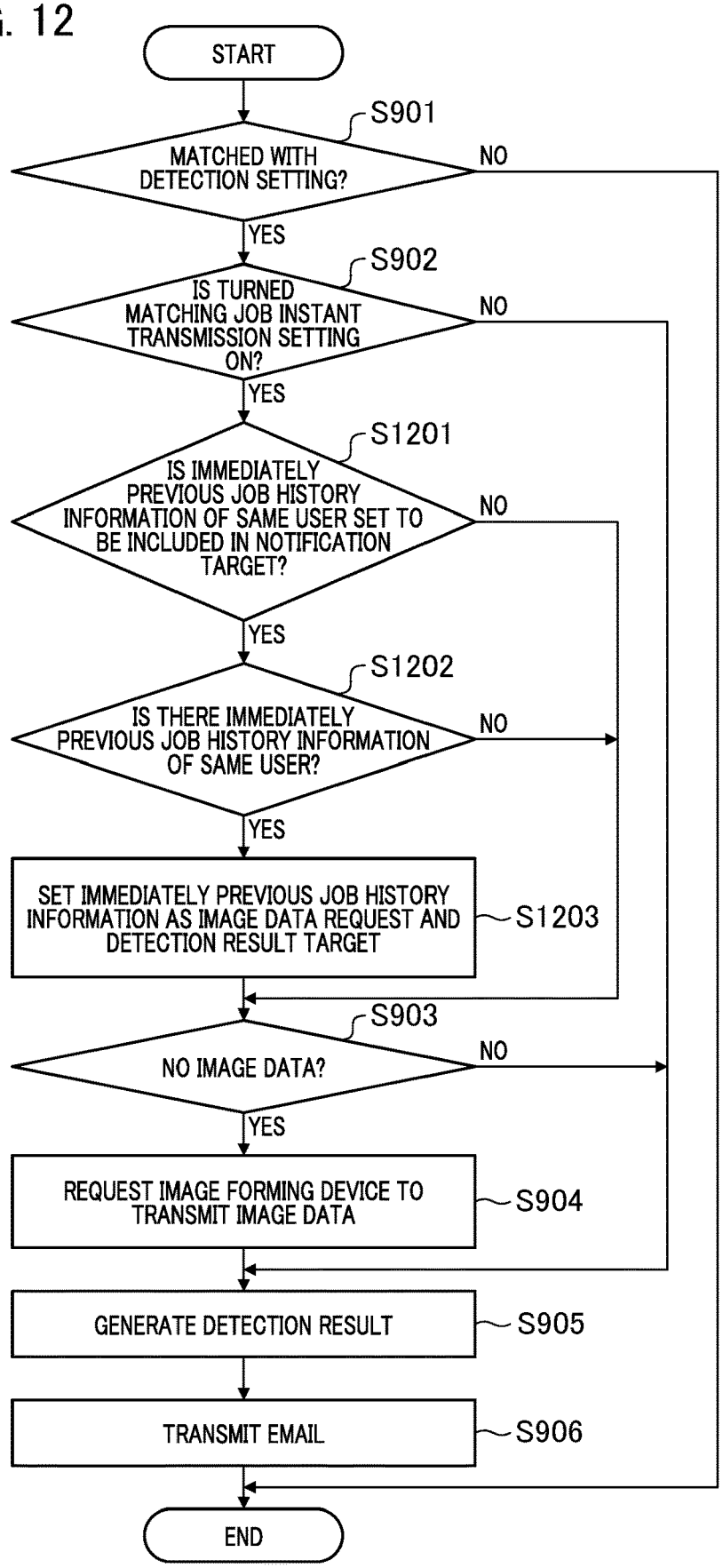
FIG. 12 is a flowchart of a situation in which the storage service according to the second embodiment receives job history information and executes a detection process.

FIG. 12 is a flowchart of a situation in which the storage service 111 according to the second embodiment receives job history information and executes a detection process. FIG. 12 illustrates a process of determining detection of the job history information transmitted from the image forming device 101 by the detection unit 406 of the storage service 111 and a process after the detection. Differences from the first embodiment are that steps of S1201, S1202, and S1203 are added and a step at the rear stage when it is determined that the matching job instant transmission setting is turned ON in S902 is changed to S1201.

In S1201, the detection unit 406 determines whether the immediately previous job history information of the same user as the job history information matched with the detection setting in S901 is set to be included in a notification target. Specifically, the detection unit 406 confirms a setting value of the immediately previous operation content notification setting 1001 of the setting management unit 401. In the case of ON, the process proceeds to S1202. Otherwise, the process proceeds to S903.

In S1202, it is determined whether there is the immediately previous job history information of the same user as the job history information matched with the detection setting in S901. Specifically, the job history information of the user is acquired from the job history information management unit 404 and it is confirmed whether there is the immediately previous job history information. For example, the job history information matched with the detection setting in S901 is the job history information of Table 1 and an immediately previous definition is assumed to be one hour. In this case, whether there is the user "userA" and job history information of an execution time "2021/12/1_08:00 to 09:00" is retrieved in the job history information management unit 404. In this process, when there is the immediately previous job history information, the process proceeds to S1203. Otherwise, the process proceeds to S903.

In S1203, the detection unit 406 sets the immediately previous job history information of the same user as the job history information matched with the detection setting in S901 as an image data request and a detection result target. Specifically, for the job history information related to S903, S904, and S905 which are the steps at the rear stage, the immediately previous job history information confirmed in S1202 is also set as target in addition to the job history information matched with the detection setting in S901. For example, in S903 and S904, it is determined whether the image data is included in the job history information. When the image data is not included, the image data is requested. This is executed on the job history information matched with the detection setting in S901 and the immediately previous job history information confirmed in S1202. The same applies to the generation of the detection result in S905.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-021818, filed Feb. 16, 2022, which is hereby incorporated by reference wherein in its entirety.

What is claimed is:

1. A management system comprising:
a memory storing instructions; and
a processor executing the instructions causing the management system to:
supply information regarding one or more types of jobs included in a storage system that stores information regarding a job transmitted from an image processing device that executes the job accompanying an output of an image;
detect predetermined information from the information regarding the job included in the storage system; and
transmit a request including identification information of a job corresponding to detection of the predetermined information to the image processing device,
wherein, in the image processing device, image data corresponding to an executed job is transmitted in a preset period of time via a network so that the information regarding the job is stored in the storage system, and attribute information and identification information of the executed job are transmitted at a timing which does not depend on the period of time,
wherein, in the image processing device, when the request is received, data including image data which corresponds to the job corresponding to the identification information designated by the request is transmitted so that the data is stored in the storage system even outside of the period of time, and
wherein the instructions further cause the management system to supply the image data corresponding to the job stored in the storage system in response to the request.

2. The management system according to claim 1, wherein, in addition to the attribute information and the identification information of the executed job, the image processing device transmits feature information acquired from image data which is an output target in a job at a timing which does not depend on the period of time via a network so that information regarding the job is stored in the storage system.

3. The management system according to claim 2, wherein the feature information is text information extracted from the image data.

4. The management system according to claim 1, wherein the attribute information includes a job name, owner information, and output identification information of the image processing device.

5. The management system according to claim 1,
wherein the job includes user information, and
wherein a use history related to jobs which are jobs before and after a job which is a target of the request and are jobs having the same user information as the job which is the target of the request is included in the target of the request.

6. The management system according to claim 1, wherein the image processing device is able to perform setting regarding whether to transmit the image data only in the period of time or at a timing which does not depend on the period of time.

7. The management system according to claim 1,
wherein the storage system has a function of deleting data stored in the storage system when a predetermined period has passed, and
wherein, even when the predetermined period has passed, the storage system does not delete image data which is image data stored in the storage system and corresponds to the job corresponding to the identification information designated by the request.

8. The management system according to claim 1, wherein the attribute information includes a file name generated by executing a job.

9. The management system according to claim 1, wherein the predetermined information includes feature information acquired from the image data.

10. A management method comprising:
supplying information regarding one or more types of jobs included in a storage system that stores information regarding a job transmitted from an image processing device that executes the job accompanying an output of an image;
detecting predetermined information from the information regarding the job included in the storage system;
transmitting a request including identification information of a job corresponding to detection of the predetermined information to the image processing device;
wherein the image processing device transmits image data corresponding to an executed job in a preset period of time via a network so that the information regarding the job is stored in the storage system, and transmitting attribute information and identification information of the executed job at a timing which does not depend on the period of time;
wherein the image processing device transmits, when the request is received, data including image data which corresponds to the job corresponding to the identification information designated by the request so that the data is stored in the storage system even outside of the period of time; and
supplying image data corresponding to the job stored in the storage system in response to the request when the information regarding the job is supplied.

* * * * *